United States Patent Office 3,014,887
Patented Dec. 26, 1961

3,014,887
ISOTACTIC POLYSTYRENE COMPOSITIONS
Robert Nobbs Haward, Bowdon, England, assignor to Shell Oil Company, a corporation of Delaware
No Drawing. Filed June 7, 1957, Ser. No. 664,160
Claims priority, application Great Britain June 14, 1956
9 Claims. (Cl. 260—45.5)

This invention relates to new polymeric compositions. More particularly, the invention relates to improved polymer compositions of the kind comprising high softening point polymers of alkenyl-substituted aromatic compounds.

Specifically, the invention provides new polymer compositions of less brittle character than the high softening point polymers of alkenyl-substituted aromatic compounds. These new compositions comprise a blend of a high softening point polymer of an alkenyl-substituted aromatic compound, and preferably an isotactic polystyrene, with a polymer selected from the group consisting of elastomers and polyolefins.

Polymers of vinyl aromatic compounds having high softening points, such as, for example, isotactic polystyrene, have many desired properties. In addition to having a high softening point, isotactic polystyrene has greater heat resistance and is less easily attacked and dissolved by many of the usual solvents as compared with polystyrene prepared by conventional polymerization processes using a free-radical type catalyst. These differences in physical properties are apparently due to a difference in molecular structure and the term "isotactic" has been used by Natta (see paper entitled "Polymers Isotactiques" presented by Von G. Natta at the Symposium of Macro-molecular Chemistry in Zurich on July 28, 1955) to describe the regular nature of the molecular structure of these high softening point polymers and to differentiate them from the polymers of vinyl aromatic compounds prepared by conventional polymerization processes.

However, it has been found that for some applications, for example, in the production of certain kinds of moldings, these isotactic polymers of vinyl aromatic compounds have the disadvantage of being somewhat brittle.

It is an object of the invention, therefore, to provide new polymer compositions of the kind comprising high softening point polymers of alkenyl-substituted aromatic compounds having improved properties. It is a further object to provide new polymer compositions containing high softening point polymers of alkenyl-substituted aromatic compounds which do not exhibit brittleness to an extent where it is detrimental to the production of molded articles. It is a further object to provide new compositions containing isotactic polystyrenes which have high softening points and improved flexibility. Other objects and advantages of the invention will be apparent from the following detailed description thereof.

It has now been discovered that these and other objects may be accomplished by the compositions of the present invention comprising blends of a high softening point polymer of an alkenyl-substituted aromatic compound, and preferably an isotactic polystyrene, and a polymer selected from the group consisting of elastomers and polyolefins. It has been found that these special blends possess high melting points, good heat resistance and poor solubility in solvents as do the isotactic polymers of the alkenyl-substituted aromatic compounds, but, in addition, fail to display brittleness to the same extent as conventional isotactic polymers. They are thus suited for use in many molding operations to which the isotactic polymers by themselves are unsuited.

The high softening point polymers of the alkenyl-substituted aromatic compounds used in preparing the compositions of the present invention are those having softening points above the level obtainable by the conventional free-radical polymerization process, such as, for example, softening points above about 120° C. By alkenyl-substituted aromatic compound is meant any aromatic compound having an alkenyl group and preferably a 1-alkenyl group or vinyl group, attached directly to an aromatic ring, such as styrene, alpha-methyl styrene, p-methylstyrene, alpha-chlorostyrene, ortho-methylstyrene, meta-methylstyrene, 2,4-dimethylstyrene and p-ethylstyrene.

The high softening point polymers of these monomers are conveniently prepared by the process described and claimed in copending patent application Serial No. 620,601, filed November 6, 1956, now abandoned. According to this process, the alkenyl-substituted aromatic compound is contacted with a catalyst comprising a mixture of compounds (a) and (b) of which (a) has the following general formula $$R_1M(X)_3$$

wherein M is Ti, Zr or Th and X is a substituent less electronegative than chlorine and is preferably an alkoxy radical (three substituents represented by X may be different groups or atoms within the definition given), and R is an alkoxy group or a halogen atom, and (b) is an aluminum dialkyl monochloride, an aluminum trialkyl or a mixture of aluminum trialkyl and aluminum trichloride. The presence of chlorine in either (a) or (b) promotes, in certain cases, the formation of polymers of higher molecular weight than would otherwise be produced.

According to this process, the monomer is contacted with the above-described catalyst at a temperature between about 20° C. to about 120° C. and preferably between 80° C. and 100° C. At the preferred temperature range, the reaction time will generally vary from about 2 to 6 hours. In general, the use of pressures other than atmospheric pressures are not required. However, as the reaction is desirably conducted in a solvent medium it may be necessary to use superatmospheric pressures to maintain the solvent in a liquid state. To avoid the use of superatmospheric pressures, it is preferred that the solvent be selected from hydrocarbon solvents which are liquid at the reaction temperature. Suitable solvents include isooctane, n-heptane, toluene, benzene and the like. Solvents, such as ethylene chloride are also suitable but are generally not preferred.

As the reaction progresses in the presence of the catalyst and solvent, the polymer will precipitate. Separation of the polymers from the reaction mixture is easily accomplished by filtrating, centrifuging and the like. However, it is desirable to treat the polymer in order to remove as completely as possible any catalyst or residue thereof which may be present in the polymer. This is simply accomplished at the end of the reaction by treating the reaction mixture with a suitable liquid which will react with, and destroy any unused catalyst. Such liquids are represented by methanol, isopropanol and other lower alcohols. This step is usually conducted at elevated temperatures in order to hasten the time required for the unreacted catalyst to be destroyed. Thereafter the polymer is filtered off and then washed with additional amounts of a lower alcohol.

The polymers prepared by the above process will be characterized by, among other things, high molecular weights and high softening points. They will preferably have molecular weights above 100,000, e.g. 100,000 to about 2,000,000 (as determined by the light scattering technique) and preferably have softening points above about 120° C., e.g. 120° C. to 215° C. Polymers having softening of the order of 135° C. have been obtained by the above process using a catalyst prepared from titanium tetraethoxide and aluminum diethyl monochloride, and such polystyrenes are particularly suited for use in preparing polymeric materials in accordance with the present invention.

The use of the above-described process in preparing isotactic polymers is illustrated by the following:

ISOTACTIC POLYSTYRENE 2.8 parts of titanium tetra-ethoxide and 12.1 parts of diethyl aluminum chloride were mixed in 139 parts of iso-octane under dry nitrogen. The mixing is conducted in a reaction vessel equipped with an agitator, heating coils and a suitable closure for maintaining an inert atmosphere as the reaction proceeds. The catalyst components are mixed for ½ hour to 1 hour at room temperature followed by the addition of 424 parts of styrene and 280 parts of iso-octane. The volumetric ratio of styrene to iso-octane is 0.88 to 1. The temperature of the reaction mixture is raised to 90° C. and maintained at that temperature for about 4 hours after which 80 parts of 8% isopropanol is added to destroy the remaining catalyst. The mass is filtered to separate the white styrene polymer after which it is washed in methanol. The polymer would not soften below 135° C.

It will be appreciated, however, that other high softening polymers of alkenyl-substituted aromatic compounds, in particular, isotactic polystyrenes, which have properties similar to those polymers obtained by the process described in the above-noted copending application may also be used in carrying out the present invention.

The other component in the compositions of the invention comprises an elastomer or a polyolefin. Elastomers include natural rubber as well as synthetic rubbers, such as, for example, butadiene-styrene copolymers which are manufactured commercially under such names as GR-S 1000, GR-S 1500, GR-S 1600, GR-S 2000, GR-S 2101 and the like, as well as rubber copolymers of butadiene and methyl methacrylate, 3,4-dichloro-alpha-methylstyrene, methyl isopropeneyl ketone, vinyl pyridine and other related unsaturated monomers. Other synthetic rubbers include the neoprene rubbers, i.e. rubbers prepared from chloroprene, such as those known commercially as GR-M, Neoprene Type Gn, Neoprene Type E, Neoprene FR and the like. Isobutylene rubbers, such as those known in industry as GR-1 rubbers are also useful.

Also included are the elastomeric copolymers of diolefin and an acrylic nitrile. The preferred diolefins are the aliphatic conjugated diolefins having 4 to 6 carbon atoms, such as butadiene, isoprene, methyl pentadiene, dimethyl butadiene and the like. The acrylic nitrile is preferably acrylonitrile. The diolefin preferably makes up at least 40% and more preferably 60% to 80% of the copolymer.

Styrene-butadiene copolymers containing a high proportion of styrene, such as, for example, 40% to 80% styrene are particularly preferred materials to be used in preparing the compositions of the invention.

Physical mixtures of two or more of the above-noted elastomers may also be used.

The above-described elastomers preferably have molecular weights varying from about 5,000 to 500,000 as determined by the light scattering technique described in Chem. Rev. vol. 40, page 319 (1948). Molecular weight may be controlled by the conventional use of chain transfer agents, such as isopropyl alcohol. The elastomeric copolymers may be prepared by any conventional method. Preferred methods of preparation are described in U.S. 2,556,851 and in U.S. 2,618,626.

Other materials that can be used alone or with the elastomers in admixture with the high softening point polymers of the alkenyl-substituted aromatic compounds comprise the polyolefins, i.e. polymers of olefins such as alpha-olefins, as ethylene, propylene, butylene and the like. Especially preferred members of this group comprise the high density polyolefins such as, for example, as may be obtained by a low-pressure olefin polymerization process. Preferably such a polyolefin is a polyethylene obtained by a Ziegler polymerization process. A detailed description of the low-pressure method for preparing these polymers may be found in copending application Serial No. 617,901, filed October 24, 1956.

Especially preferred polyolefins to be used are the polymers of alpha-olefins that have an intrinsic viscosity of at least 1.0 and a softening point above about 100. The polyethylenes preferably have an intrinsic viscosity greater than 1.4 and a softening point above 110° C., e.g. 110° C. to 200° C. Such high softening point polymers are utilized to help maintain the heat resistant properties of the high softening point polymers of the alkenyl-substituted aromatic compounds.

Although polymeric materials of useful physical characteristics may be obtained in accordance with the present invention by blending one or more high softening point polymers of the alkenyl-substituted aromatic compounds with widely varying proportions of the elastomer as natural or synthetic rubbers, it has been found that in general, large amounts of rubber are undesirable since the desirable high softening properties of the high softening point polymer are adversely affected; in consequence, it is preferable to limit the amount of elastomer with which the high softening point polymer is blended to below about 30% by weight. Preferably the polymeric material contains between 1% and 25% by weight of the elastomer or mixture of elastomers.

When the polyolefin is used as an additive material in preparing polymeric materials in accordance with the present invention, they are preferably utilized in amounts of 5% to 80% by weight. As noted, it is preferred to use a polyethylene of high softening point in order to preserve the heat-resistant properties of the high softening point polystyrene. Such polyethylenes, which are often referred to as low pressure or high density polyethylene, have a softening point above 110° C. and an intrinsic viscosity greater than 1.4. When such a polyethylene is used, the polymeric material should contain at least 10% by weight thereof and at least 20% by weight of the high softening point polymer of the alkenyl-substituted aromatic compound.

The polymeric materials of the present invention are prepared by blending, i.e. forming an intimate physical mixture of, one or more polymers of an alkenyl-substituted aromatic compound, high softening point (isotactic), which is preferably a polystyrene, with one or more elastomer or a polyolefin in mixing equipment of conventional type, for example, a Banbury mixer or a roller mill with heated rollers or an extrusion mixer. When the elastomer is a rubber a Buss Ko-Kneader has been found suitable for producing the required blend: alternatively it is possible to mix the high softening point polymer of the alkenyl-substituted aromatic compound in powdered form with a rubber latex to obtain a fine dispersion therein and which on coagulation of the latex forms an intimate mixture of the polymer of the akenyl-substituted aromatic compound and the rubber.

The new compositions of the invention possess the desired physical properties of the high softening point polymers of the alkenyl-substituted aromatic compounds, such as high softening point, reduced solubility in solvents and good heat resistance, and in addition, have greatly reduced brittleness to the extent that they can be used in molding operations. Such products are thus of use in preparation of molded plastic articles, such as containers, toys, combs, telephones, and the like.

The invention is illustrated by the following examples. Unless otherwise indicated, parts are parts by weight.

*Example I*

This example illustrates the preparation and some of the improved properties of a blend of isotactic polystyrene and a butadiene-styrene copolymer containing 23% styrene.

An isotactic polystyrene having a softening point of about 135° C. and prepared as noted above is ground and placed on a 2-roll mill at 200° C. 20 parts (per 100 parts of the polystyrene) of the copolymer of butadiene are added to the polystyrene over a course of about 5 minutes, and the blend is then milled for an additional 5 minutes. The product is stripped from the rolls and cut into small pieces.

A sheet pressed from this blend is found to be strong and have high softening point, good heat resistance and to be less brittle than the original isotactic polystyrene.

Related results are obtained by replacing the butadiene-styrene copolymer with equal amounts of each of the following: copolymer of butadiene-acrylonitrile containing 40% acrylonitrile, copolymer of butadiene-isoprene and acrylonitrile and a copolymer of butadiene-styrene containing 60% styrene.

*Example II*

Example I is repeated with the exception that the amount of the elastomer is changed so that the weight ratio of polystyrene to the elastomer is 85:15, 90:10 and 95:5. In each case, products having reduced brittleness are obtained.

*Example III*

This example illustrates the preparation and some of the improved properties of a blend of isotactic polystyrene and a high density polyethylene.

An isotactic polystyrene having a softening point of about 135° C. and prepared as noted above is ground and placed on a 2-roll mill at 200° C. 30 parts of polyethylene having a melt index of 0.02 are added to the polystyrene over a course of about 5 minutes and the blend is then milled for an additional 5 minutes. The product is stripped from the rolls and cut into small pieces.

A sheet pressed from this blend is found to be strong and have high softening point, good heat resistance and to be less brittle than the original isotactic polystyrene.

Related results are obtained by replacing the polyethylene in the above process with equal amounts of other polyethylenes having melt indices above about 0.02.

Related results are also obtained by replacing the isotactic polystyrene in the above process with isotactic polystyrene having a softening point of 125° C.

*Example IV*

Example III is repeated with the exception that the amount of the polyethylene is changed so that the weight ratio of polystyrene to the polyethylene is 60:40, 50:50, 70:30. In each case, products having reduced brittleness are obtained.

*Example V*

An isotactic polystyrene having a softening point above 135° C. and a melting point of about 225° C. was mixed with a sufficient amount of a GR–S rubber latex (containing about 40% solids) of the kind known as Krylene N.S. to give, on drying the resulting mixture at about 60° C., a blend of isotactic polystyrene and rubber containing 15% by weight of rubber. The blend was then processed to improve the degree of dispersion of the rubber therein by passing it three times through an injection moulding machine at 190–200° C., the moulding pieces obtained in the first and second moulding operations being returned to the hopper of the moulding machine. The moulding pieces obtained from the third operation were broken up and the resulting polymeric material was compression moulded into bars for impact strength tests which were determined on a standard Izod machine. By way of comparison impact strengths were also determined for a conventional polystyrene and a conventional "high impact" polystyrene and also for the isotactic polystyrene used in this example. The results obtained are as follows:

Impact strength ft. lb. per inch notch
Isotactic polystyrene _____ 0.06
Conventional polystyrene _____ 0.30
"High impact" polystyrene _____ 0.50
Polymeric material in accordance
  with the present invention _____ 0.60

*Example VI*

Isotactic polystyrene of the kind referred to in Example V was mixed with an equal weight of powdered polyethylene which had itself been prepared by a low-pressure (Ziegler) process using a catalyst formed by mixing aluminum diethyl monochloride and titanium tetrachloride. The polyethylene had a melt index of 0.02. An antioxidant comprising 0.25 parts of trioctyl phosphite per 100 parts of polystyrene was added to the mixture which was then processed in the manner described in Example I to give a polymeric material having an impact strength of 0.45 ft. lb. per inch notch.

I claim as my invention:

1. A polymer composition comprising a blend of (1) an isotactic polystyrene having a softening point above 120° C. and (2) a rubbery polymer of butadiene, the amount of the rubbery polymer making up from 1% to 25% by weight of the combined mixture.

2. A polymer composition as in claim 1 wherein the butadiene polymer is a copolymer of butadiene and acrylonitrile.

3. A polymer composition as in claim 1 wherein the butadiene copolymer is a butadiene-styrene copolymer.

4. A polymer composition comprising a blend of (1) an isotactic polystyrene having a softening point above 120° C. and (2) a polyethylene having a softening point between 100° C. and 200° C., the amount of polyethylene making up from 20% to 80% by weight of the mixture.

5. A polymer composition comprising a blend of (1) an isotactic polystyrene having a softening point above 120° C., and (2) a polymer of the group consisting of rubbery polymers of conjugated diolefins and polymers of monoolefins having a softening point between 100° C. and 200° C.

6. A polymer composition comprising a blend of (1) an isotactic polystyrene having a softening point above 120° C., and (2) a synthetic rubber comprising a polymer of a conjugated diolefin, the amount of rubber being from .1% to 30% by weight of the combined mixture.

7. A polymer composition comprising a blend of (1) an isotactic polystyrene having a softening point above 120° C., and (2) a polyolefin having a softening point between 100° C. and 200° C., the amount of the polyolefin varying from about 10% to 80% by weight of the mixture.

8. A polymer composition as in claim 6 wherein the synthetic rubber is a copolymer of butadiene and a monomer containing a single $CH_2=C=$ and containing at least 40% butadiene units.

9. A polymer composition as in claim 7 wherein the polyolefin is a high softening point polyethylene.

References Cited in the file of this patent

UNITED STATES PATENTS

| | | |
|---|---|---|
| 2,282,002 | Scott et al. | May 5, 1942 |
| 2,439,202 | Daly | Apr. 6, 1948 |
| 2,574,439 | Seymour | Nov. 6, 1951 |
| 2,578,518 | Ditz et al. | Dec. 11, 1951 |
| 2,643,987 | Harrison et al. | June 30, 1953 |
| 2,655,492 | Young et al. | Oct. 13, 1953 |
| 2,797,203 | Barber et al. | June 25, 1957 |
| 2,805,181 | Groff et al. | Sept. 3, 1957 |
| 2,844,562 | Ingram | July 22, 1958 |

OTHER REFERENCES

Natta, Jour. Polymer Science, 16, 143–154 (1955).

Mark et al.: "Collected Papers of Wallace Hume Carothers," page 392 (volume 1 of "High Polymers"), published by Interscience Publishing, Inc., New York, 1940.

Boundy et al.: "Styrene," pages 760, 761, published by Reinhold, New York (1952).